United States Patent [19]

Copp

[11] 4,061,260
[45] Dec. 6, 1977

[54] BAG MAKING MACHINE

[76] Inventor: Robert M. Copp, 271 Thames St., Bristol, R.I. 02809

[21] Appl. No.: 671,263

[22] Filed: Mar. 29, 1976
(Under 37 CFR 1.47)

[51] Int. Cl.² .......................................... B65H 17/26
[52] U.S. Cl. .................................. 226/139; 226/156; 226/185; 226/191
[58] Field of Search .............. 226/181, 185, 186, 187, 226/190, 191, 194, 139, 152, 156

[56] References Cited
U.S. PATENT DOCUMENTS

| | | | |
|---|---|---|---|
| 2,745,663 | 5/1956 | Hamilton | 226/194 X |
| 3,309,035 | 3/1967 | Degutis | 226/191 X |
| 3,339,818 | 9/1967 | Morrow | 226/190 |
| 3,679,115 | 7/1972 | Stock | 226/194 X |

Primary Examiner—Richard A. Schacher
Attorney, Agent, or Firm—Wolf, Greenfield & Sacks

[57] ABSTRACT

A machine for cutting and sealing bags from a web of thermoplastic sheet material includes low inertia drive rolls to feed the thermoplastic sheet in closely controlled, incremental lengths. The drive rolls are driven by a fluid motor which is controlled by a stepping motor. The sheet is fed to a cutting and sealing head which has means for gripping the fed segment of the web to hold it in position to be cut and sealed. Sealing is effected by resistance wires on the head which are applied to the thermoplastic sheet. The amount of electrical energy applied to the resistance heating wires is controlled and measured carefully to avoid overheating or underheating of the wire.

1 Claim, 9 Drawing Figures

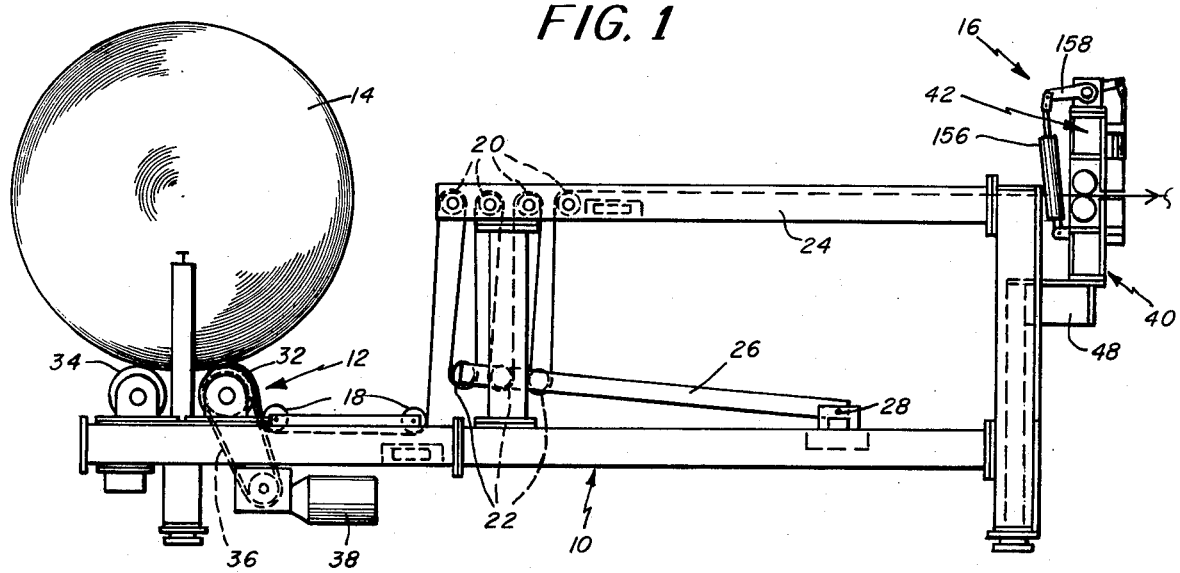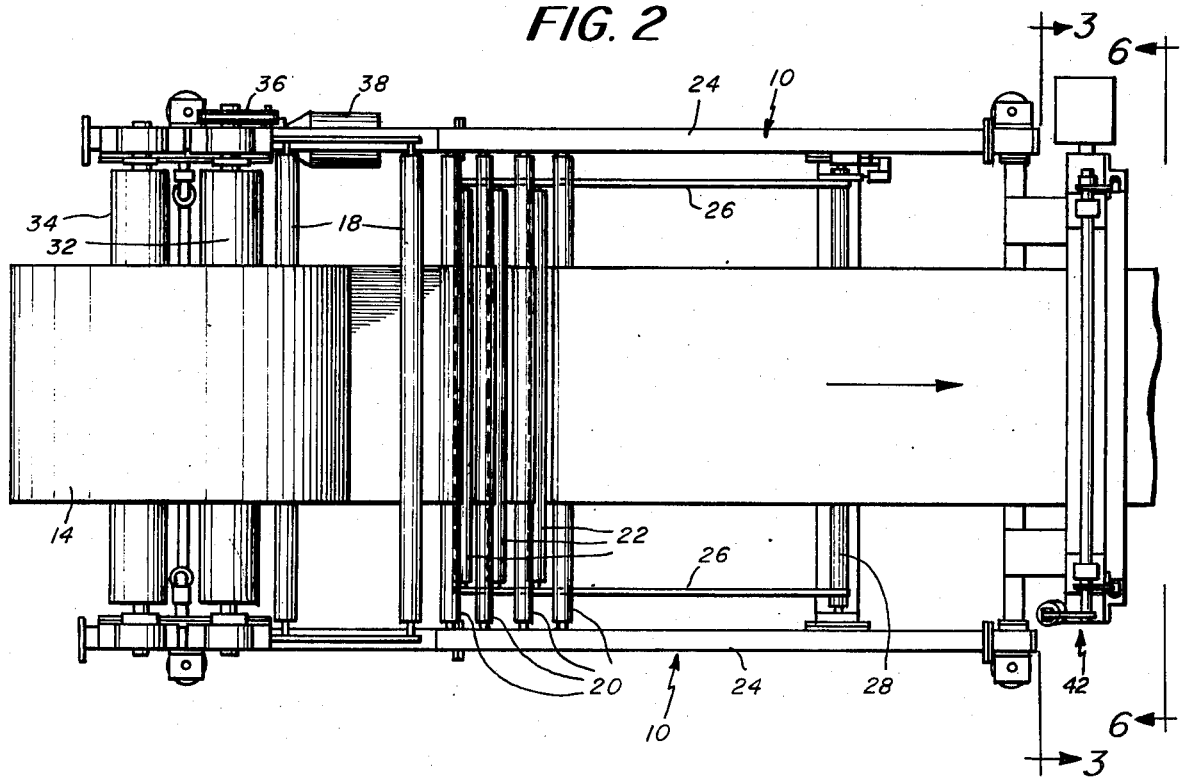

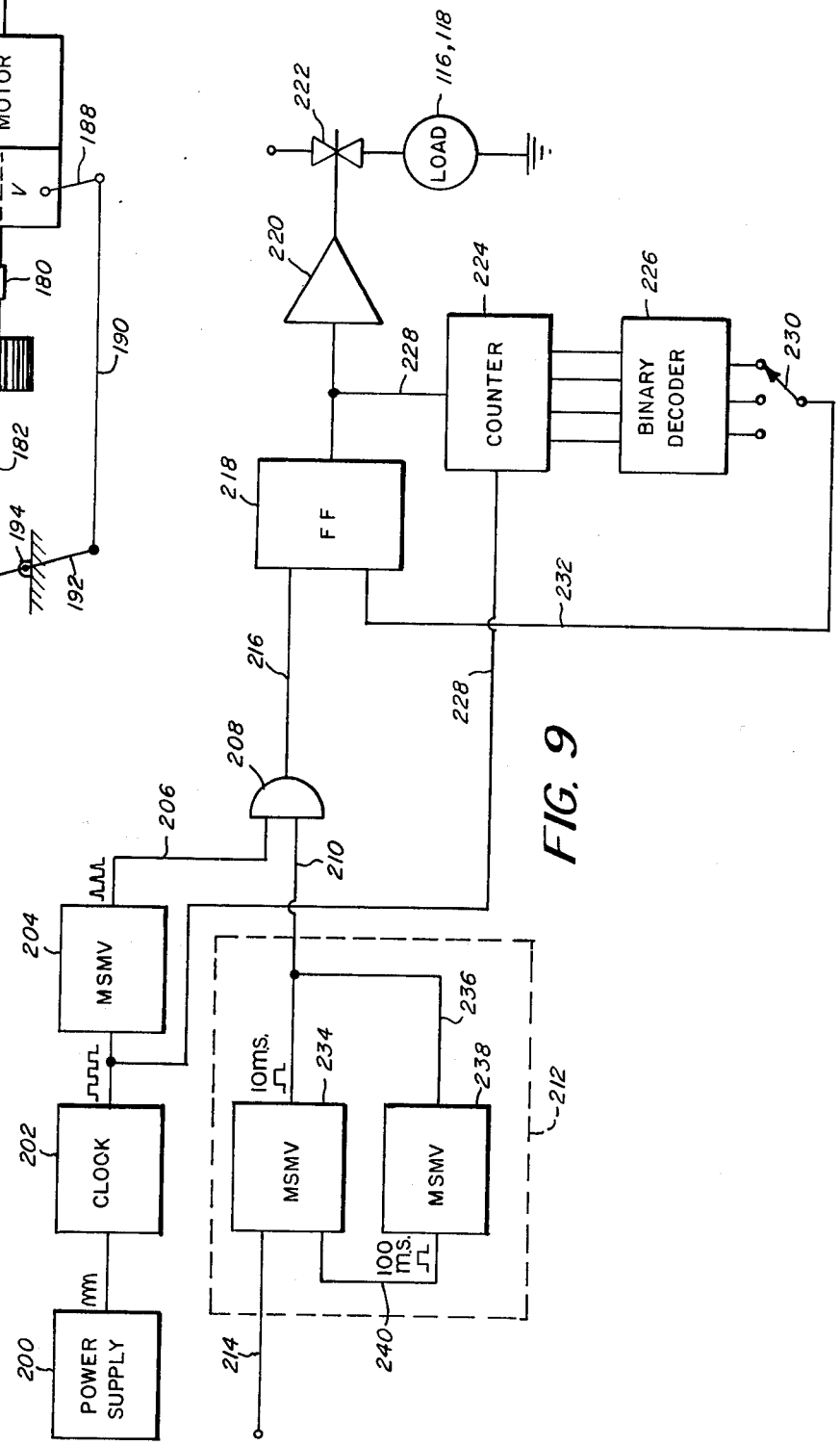

BAG MAKING MACHINE

BACKGROUND OF THE INVENTION

This invention relates to bag making machines and, particularly, to machines for cutting and sealing a plastic web or tube to an intended bag configuration. Although a number of machines of this type are in use in the manufacture of such bags, they are far from ideal and have a number of significant limitations. By way of example, a typical bag making machine has an arrangement at one end for supporting the axle of a roll of sheet material from which the web is unwound. The web is drawn to a cutting and sealing station by a pair of nip rollers.

The rollers are rotated to advance a fixed length of web to a cutting and sealing station where the web is then cut and sealed to form the bag. The rollers typically are driven by a mechanical crank arrangement which tends to seriously limit the speed of the machine. Also among the difficulties encountered with the prior devices is that the drive rolls, which often are of the order of four or five feet long, sometimes display a tendency to twist or flutter as they rotate, particularly when an effort is made to operate the machine at its highest speed range. This causes variations in the grip which the rollers apply to the web which results in lateral shifting and misalignment of the web. This difficulty can be particularly acute when one side of the bag is gussetted and in which the gussetted region is effectively four layers thick while the other regions of the web are only two layers thick. In order to overcome the flutter or twist tendency, the rolls, which are supported at their ends, typically have been made of a heavy and massive construction. The use of such massive rolls, however, further restricts the speed of the machine because of the high inertia of the roll which makes it difficult to start and stop rapidly. Also, the use of such massive rolls generally requires a heavy duty type of drive mechanism for the rollers.

Another difficulty often encountered with the prior art devices relates to the heat sealing of the thermoplastic bags. Typically, the heat sealing is effected by applying heated wires to the bag material to briefly melt a region of the thermoplastic web and fuse it together. Often, the heat sealing operation is also employed to cut through the web to sever it, as is the case when making "side weld" bags. It has been common practice to heat the wire more than is necessary to melt, fuse and cut through the thermoplastic sheet. Not infrequently, this results in a tendency for the sealed region of the bag to remain tacky for a longer period than is desirable and in some instances, the bag may tend to stick to the wire. This interferes with the operation of the machine and often require that the machine be shut down for maintenance. In addition, it should be noted that when making side weld bags, a cut and sealed bag is withdrawn from the machine by pulling it from the cutting and sealing station. Usually, the bag is tensioned slightly while it is being cut and sealed which causes the melted thermoplastic to be drawn out at the cut and sealed region which results in a thinner and weaker bag construction at that seam. Also, the overheating of the wire reduces the useful life of the wire.

A further difficulty encountered with prior bag making machines relates to the cutting and sealing of bags bearing printed material. The webs of material employed in the making of such bags are printed at regularly spaced intervals along the web and it is important that the cutting and sealing of the web occurs at the precise, desired location between repetitive printings. This, in turn, requires that the drive mechanism be controlled to feed the web in precise increments to insure proper registration of the printed material on the finished bag. Such accuracy sometimes is complicated considerably if the web has been stretched. Often, the machine must be shut down for readjustment when printed bags are being made. In general, the prior machines include a mechanical crank-type drive which is set to advance the web slightly more than the intended bag length. A photoelectric sensing device is incorporated into the machine to sense the advancement of an imprinted registration mark on the web and the output from the photocell is employed to actuate a brake to stop the drive mechanism. Such machines are operated at as high as production rate as is possible and the brakes tend to heat up and do not always stop the advancement of the bag precisely in registry with the cutting and sealing station. The error thus introduced becomes cumulative which necessitates readjustment of the machine at frequent intervals.

It is among the general objects of the invention to provide a bag making machine which avoids the above and other difficulties.

SUMMARY OF THE INVENTION

The machine includes a frame having at one end a support for a roll of thermoplastic sheet material to be used in making the bags. The other end of the frame includes a cutting and sealing head and also supports the drive rollers. The frame also supports a dancer arrangement between the supply roll and the head which takes up any slack in the web and which maintains a desired degree of tension on the web between the roll and the head. The web is drawn and fed to the cutting and sealing elements by low inertia drive rolls which are hollowed out and are rotatably at a plurality of spaced locations along the length of the rolls. The rolls are driven by an electronically controllable motor arrangement which is capable of accelerating and decelerating rapidly to advance the web a desired increment in a relatively short time. The number of revolutions of the motor are employed to control the number of revolutions of the drive rollers to thereby determine the length of incremental advancement of the web. The rollers advance the incremental length of sheet through the cutting and sealing head where the web is cut and sealed.

The cutting and sealing assembly includes a lower, stationary portion and an upper portion which is movable toward and away from the lower portion. The upper portion is raised as the rolls advance an incremental length of web through the sealing assembly. After the incremental length of the web has been fed into position, the upper portion of the assembly moves downwardly to engage the web and cut and seal it. Each of the upper and lower sealing assembly sections carries a pair of resistance wires which, when the sealing sections are brought together, define a pair of transversely extending, spaced seal lines. The upper portion of the sealing assembly also carries a knife which cuts the web along a transverse line which extends between and parallel to the sealing lines. Depending on the type of bag being made, either or both of the pairs of sealing wires may be employed. In order to insure that the web is held properly during the cutting and sealing operation, each of the upper and lower sealing assembly portions carries a transversely extending gripper bar which cooperate to frictionally engage and grip the web at a location outwardly of the heating elements. The region of the web which is to be heated and sealed thus is held on one side by the gripper bars and on the other by the drive rollers.

The electrical energy applied to the resistance wires is controlled carefully by an improved control circuit for the heater wires which measures precisely the duration of the current flow through the wires.

It is among the primary object of the invention to provide an improved machine for making bags from a web or tube of thermoplastic sheet material.

Another object of the invention is to provide a bag making machine of the type described which is capable of achieving higher speeds with increased accuracy.

A further object of the invention is to provide a machine of the type described which requires less readjustment.

Another object of the invention is to provide an improved configuration for drive rollers for advancing thin webs or sheets and in which the tendency of the rollers to flutter or twist is minimized while providing a low inertia roller construction.

A further object of the invention is to provide a bag making machine of the type described in which the web feeding rolls can be driven by a relatively low powered drive arrangement.

Another object of the invention is to provide a bag machine of the type described which has more precise control of the bag length.

Still another object of the invention is to provide an improved heat sealing arrangement.

DESCRIPTION OF THE DRAWINGS

The foregoing and other objects and advantages of the invention will be understood more fully from the following further description thereof, with reference to the accompanying drawings wherein:

FIG. 1 is a side elevation of the bag making machine;

FIG. 2 is a plan view of the bag making machine;

FIG. 8 is a somewhat schematic illustration of the drive mechanism for rotating the feeding rolls; and FIG. 9 is a diagrammatic illustration of the circuitry for applying the heat sealing pulse to the resistance sealing wires.

DESCRIPTION OF THE PREFERRED EMBODIMENT

Figure 3:
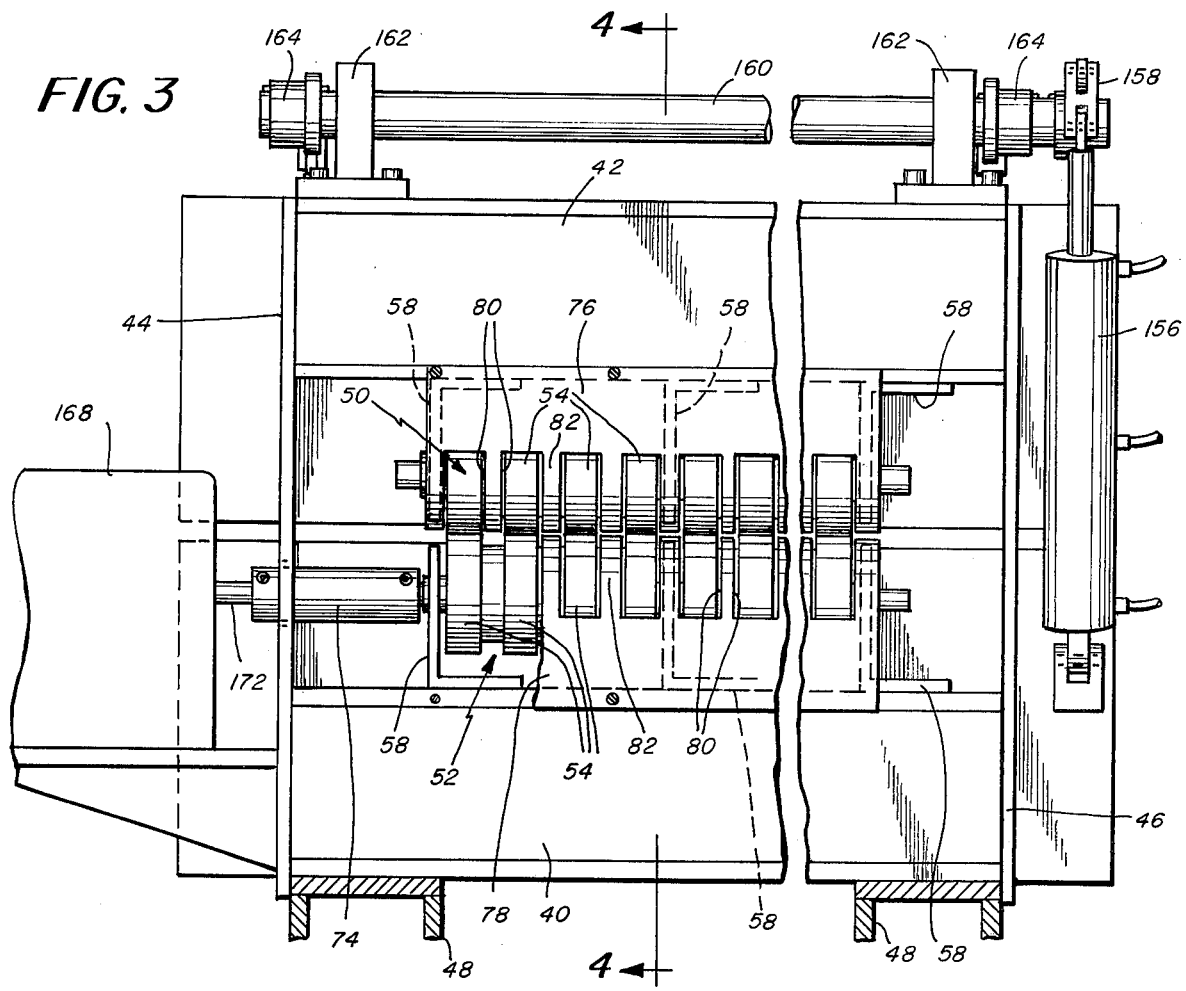
FIG. 3 is a rear elevation of the heat illustrating the drive roller arrangement as seen from its inlet side.

As shown in FIGS. 1 and 2, the machine includes a frame 10 having a support 12 for a supply roll 4 of thermoplastic sheet material to be used in fabricating the bags. A head, indicated generally at 16, is mounted to the other, forward end of the frame 10 and carries the drive rolls and cutting and sealing arrangement as will be described. The web of sheet material is guided from the bottom of the roll 14 about the rollers 18 to a series of rollers 20, 22 in a serpentine configuration. The rollers 20 are mounted to and between the rearward ends of a pair of rails 22 which form a pair of the frame. The rollers 22 are supported by a dancer 26 which is pivoted at 28 to the frame 10 and which can move up and down to take up slack in the web and maintain the web in a taught configuration as it advances from the roll 14 to the head 16. The web passes from the rollers 20 toward the head 16 and between the rails 24. Various supplemental devices commonly employed in the manufacture of such bags may be mounted to the rails 24 to operate on the span of the web between the rollers 20 and the head 16. For example, a hole punching or a slitting device could be mounted to the rails 24. Also, depending on the type of bag being fabricated, a folding device may be mounted to the rail to fold the web to a desired configuration before it reaches the head 16. For example, the folding device to shape the bag to a gussetted configuration may be mounted on the rail. It should be noted that the machine can operate on tubular webs or U-shaped webs and is capable of making bottom seal bags as well as side seal bags.

The illustrative embodiment of the machine also includes an improved roll support 12. The roll support 12 is located at the rearward end of the machine, relatively close to ground level, and includes a pair of support rollers 32, 34 on which the supply roll 14 may be placed. The roll 34 is free wheeling and roll 32 is driven at the intended speed of the web through a belt or chain 36 and motor 38 which is secured to the frame 10. The supply roll 14 is supported solely by the rollers 32, 34. This is to be contrasted with the typical prior art arrangement in which the supply roll is provided with a central axle which requires the entire roll to be raised and the axle then attached to elevated supports. With the present invention, the heavy roll 14 can be carried directly to the machine by a forklift truck and can be rolled directly onto the rollers 32, 34. There is no need to lift and position the heavy supply roll 14 as with the prior art devices which, typically, require the effort of at least two men. In addition, the above arrangement for supporting the supply roll 14 eliminates the requirement for an arrangement to vary the rotational speed of the web unwinds from the supply roll. In this regard, it should be noted that with the prior type of device, in which the roll 14 is supported for rotation about a central axle, the drive motor which rotates the roll must be increased as the diameter of the roll decreases in order to maintain the desired constant web speed. With applicant's invention the motor 38 can be operated at a constant single speed because the roll 14 is driven by roller 32 directly at the periphery of the roll 14.

Figure 4:
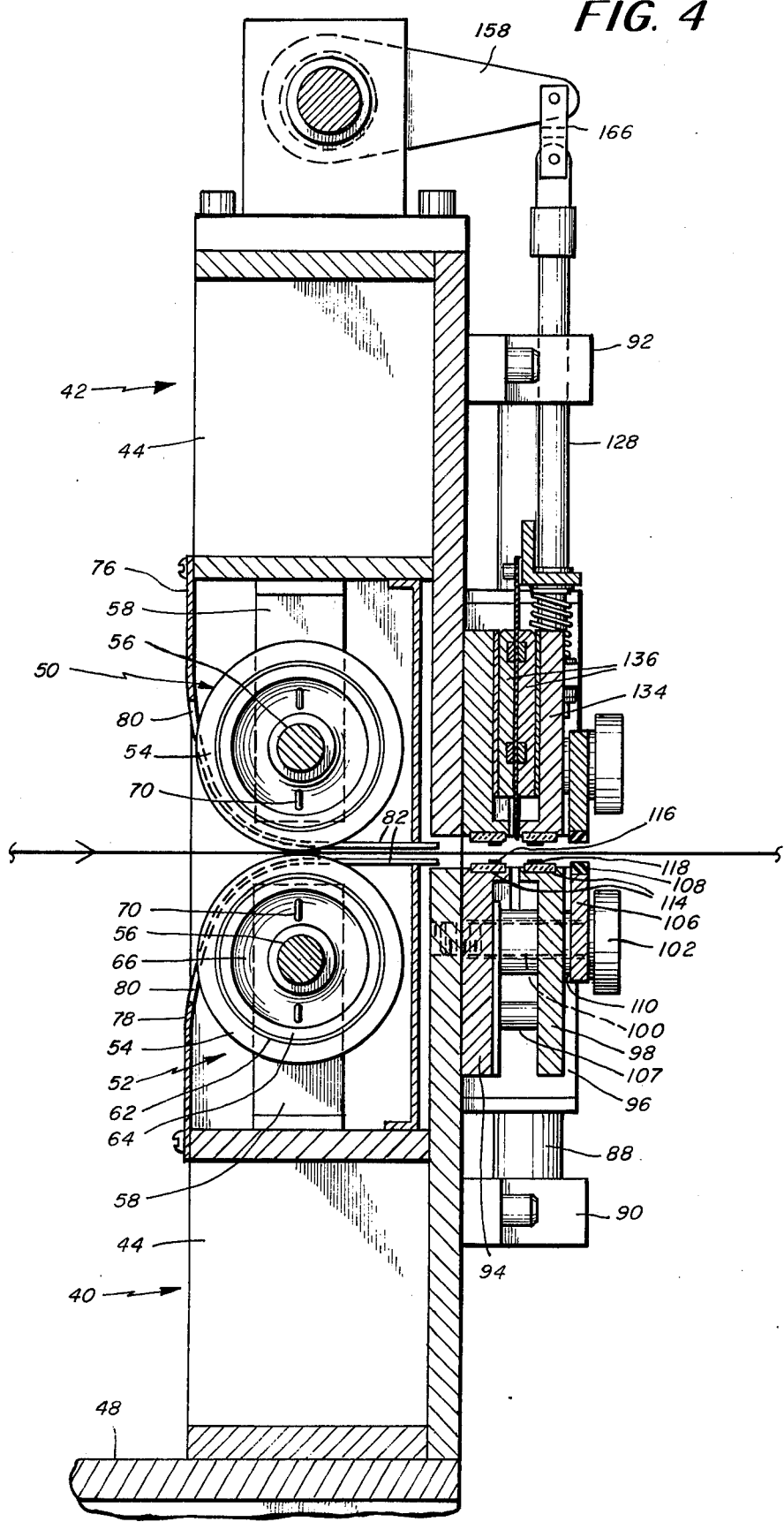
FIG. 4 is a sectional elevation of the head as seen along the line 4—4 of FIG. 3.

As shown in FIGS. 3 and 4, the head assembly 16 includes a lower head frame member 40 and an upper head frame member 42 which are secured together by a pair of side frame members 44, 46. The entire head frame section may be secured to the frame 10 by a frame extension 48 (FIG. 1).

The head assembly carries a pair of web feeding rolls, the upper roll being indicated at 50 and the lower roll at 52. The feeding rolls 50, 52 are rotatably mounted to the upper and lower frame sections 42, 40 respectively and cooperate to define a transversely extending nip line through which the web of thermoplastic sheet material is drawn. The rolls, for example, may be of the order of three to four feet long, depending on the size of the machine and the intended range of bag sizes and configurations to be made. Each of the rolls 50, 52 includes a plurality of axially spaced, circular friction rings 54 which are secured to the peripheries of the rolls and cooperate to firmly grip the web. The machine preferably is intended to be used with webs of a maximum width which is slightly less than the overall length of the feed rolls. This insures that the upper, idling feed roll will be driven directly by at least one or two of the corresponding circular friction rings 54.

Figure 5:
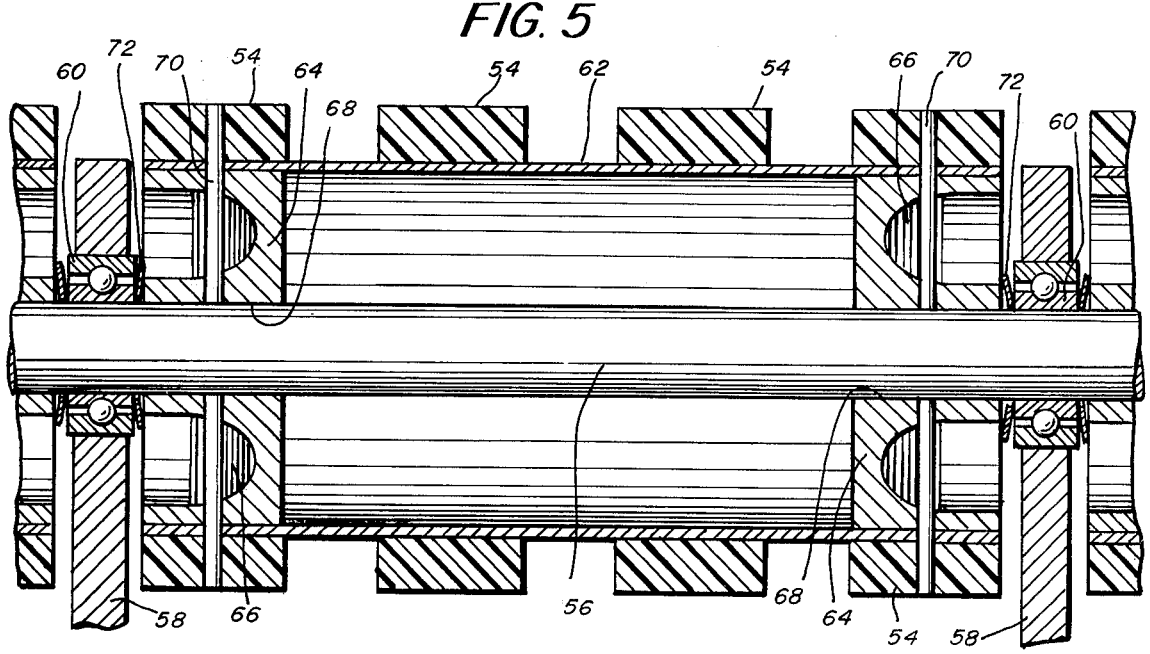
FIG. 5 is an enlarged sectional illustration of a typical segment of one of the drive rollers.

As mentioned above, an important feature of the invention resides in the construction of the feed rolls 50, 52. Unlike the prior art web feeding rolls which are of heavy, massive construction to retard twist, flutter and fluxing of the rolls, the present invention employs light weight, low inertia rolls. A typical segment of the feed rolls is shown in section in FIG. 5. Each of the rolls includes an elongate main shaft 56 which extends through and along the full length of the roll. The shaft 56 is supported for rotation at a plurality of spaced locations by a plurality of support brackets 58 which, in turn, are secured to the upper and lower frame sections 42, 40 repectively. The shaft 56 is mounted to the brackets 58 by ball bearings 60. Between each pair of adjacent support brackets 58, the main roll shaft 56 carries a thin-walled cylinder 62 which is of substantially larger diameter than the main shaft 56. The cylinder 62 preferably is made from a light-weight material such as aluminum. The cylinders 62 are mounted to the shaft 56 by end caps 64 which are fitted into and close the ends of the cylinder 62. The end caps 64 are secured to the cylinder 62 by brazing or other appropriate technique. The end caps 64 preferably have an annular, hollowed-out region indicated at 66 to further reduce the weight of the roll. Each of the end caps 64 has a centrally located hole 68 through which the main shaft 56 passes. Each cylinder 62 is secured in place on the shaft 56 by a pin 70 which is passed through aligned diametrical holes in the cylinder 62, end cap 64 and shaft 56. A Belville washer 72 may be interposed between each end cap 64 and its adjacent ball bearing 60. The friction rings 54 are mounted to and about the cylinder 62 as shown. The lower feed roll 52 is connected through a coupling 74 to the drive motor arrangement which will be described. The friction rings 54 of the upper of the web feeding rolls 50 bear against the aligned friction rings of the lower roll 52. The device is arranged so that the upper friction rings will engage, lightly, the lower friction rings, so that when the web of material is interposed between the rollers 50, 52 the upper feed roll will rotate in response to the lower feed roll and advancing web to maintain a firm, frictional grip on both sides of the web. The feedrolls 50, 52 are sufficiently long so that they will be able to receive the widest webs expected to be operated on and in which at least the endmost friction rings on each end of each feedroll 50, 52 will be in direct engagement with each other and will not engage the web itself. This insures that there will be a direct driving contact from the feed roll 50 to the feedroll 52 which will insure uniform feeding of the multiple layer web, even with gussetted bags. The friction rings may be made from a variety of suitable materials displaying good frictional characteristics. It also is desirable to select a material which will not tend to develop a static electrical charge during operation. Polyethylene has been found to be suitable for this purpose.

The feed rolls 50, 52 thus are substantially hollow and are of very light weight construction to present minimal inertia which enables the rolls 50, 52 to be accelerated or decelerated rapidly. In addition, the often encountered tendency of the rolls to twist, bend or flutter in operation is reduced significantly. In this regard, it should be noted that the torque applied to the feed rolls is taken up primarily by the cylinders 62 which, although relatively thin walled, are disposed far enough from the axis of the roll to present a substantial resistance to twisting. It is important, therefore, that the connection between the main shaft 56, end caps 64 and cylinders 62 is firm and rigid. It also is important to minimize the space between the ends of adjacent cylinders. Although the major proportion of torque applied to the shaft 56 will be taken up by the cylinders 62 as described the shaft 56 does take up some of the torque in those of its portions which extend between the end caps 64. The cumulative length of shaft's free span between the end caps 64, however, is far less than the total length of the roll so that even though these intermediate regions of the shaft 56 are exposed to the full developed torque, their reduced length does not permit them to twist or bend to a significantly adverse extent.

The rolls 50, 52 preferably are enclosed in slotted sheet metal housings 76, 78 which are secured to the upper and lower head frame members 42, 40. As shown in FIG. 4, the housings 76, 78 have a plurality of spaced slots 80 through which the friction rings 54 of the rolls 50, 52 protrude. The slots 80 are defined by fingers 82 which extend between and forwardly of the friction rolls 54 toward the cutting and sealing station to provide a guideway for the advancing sheet.

Figure 6:
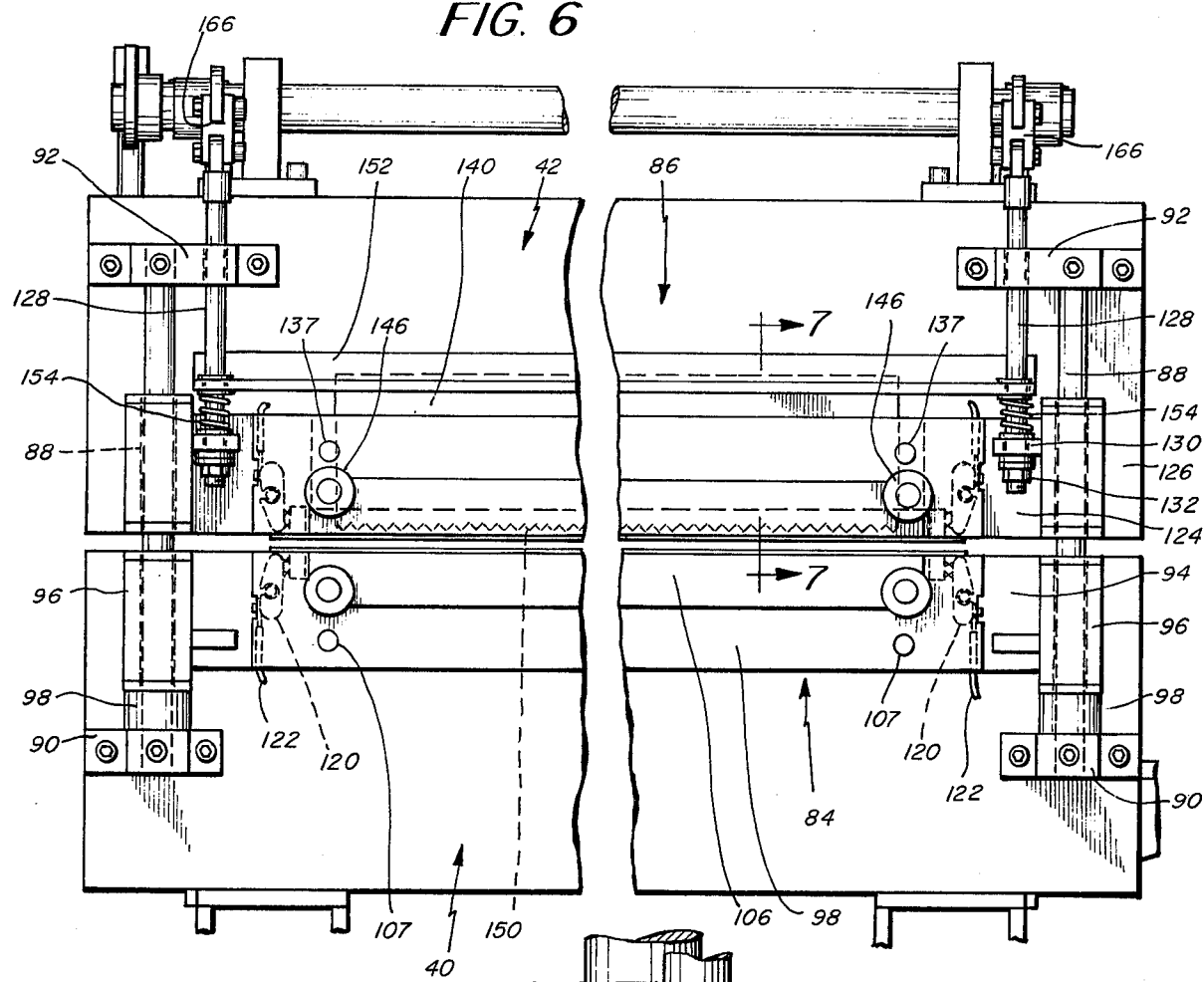
FIG. 6 is a rear elevation of the head as seen from its outlet side.
Figure 7:
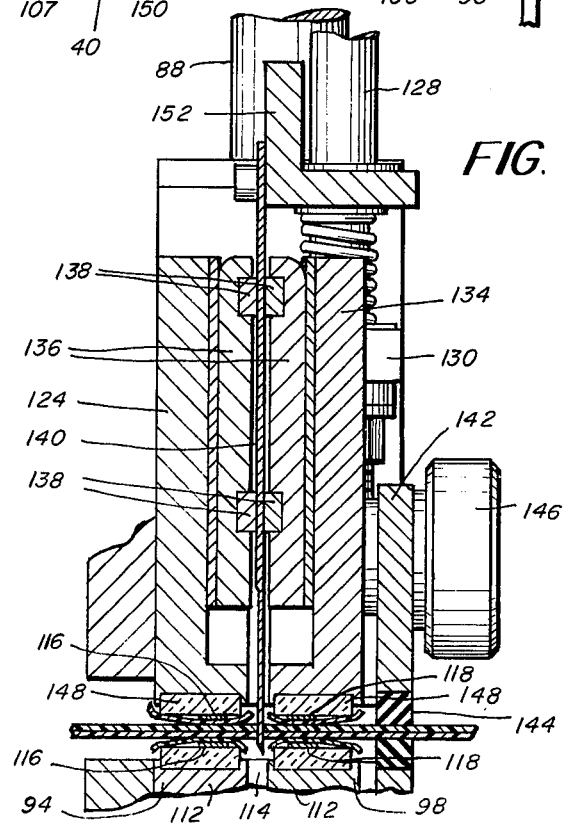
FIG. 7 is a sectional elevation through the cutting and sealing head as seen along the line 7—7 of FIG. 6.

The cutting and sealing mechanism is shown in more detail in FIGS. 4, 6 and 7. It includes a lower sealing assembly, indicated generally by the reference character 84, which is mounted in a fixed position on the lower head frame member 40. An upper sealing assembly, indicated generally by the reference character 86, also carries a cutting knife. The upper sealing assembly is mounted to the head 16 for vertical movement toward and away from the lower sealing assembly 84. FIGS. 4 and 6 show the spaced, idle position of the movable upper sealing assembly 86 and illustrates the gap between the upper and lower sealing assemblies 86, 84 through which the web of material may be advanced by the feed rollers 50, 52.

The lower sealing assembly 84 is supported and the upper cutting and sealing assembly 86 is guided by a pair of vertical rods 88 mounted to the front side of the head 16 by bracket 90, 92 which are secured, respectively, to the lower head frame member 40 and upper head frame member 42. The lower sealing assembly 84 includes a rear plate 94 having a pair of brushings 96 secured at its lateral ends. The bushings 96 receive the vertical rods 88. The bushings 96 rest on spacers 98 which also receive the vertical rods 88 and rest on the bracket 90. The lower sealing assembly 84 also includes a front plate 98 which is attached to the rear plate 94 by screw 100, each having an enlarged knob 102 exposed at the front end of the device. Spacers 104 are interposed between the plates 94, 98. The parts are held together by the screws 100 which pass through holes in the front plate 98 and spacers 100 and is theaded into the rear plate 94. The lower sealing assembly 84 also includes a transversely extending gripping bar 106 having a high friction pad 108, such as rubber, extending along its upper edge for a purpose to be described. The gripping bar 106 also is secured in place by the screws 100 which is passed through receptive openings formed in the gripping bar 106. Spacers 110 preferably are interposed between the front plate 98 and bar 106. The foregoing elements of the lower sealing assembly may be easily assembly and disassembled by fastening or unfastening the screws 100. In order to facilitate the proper alignment of the various plates, a pair of registration pins 107 preferably are secured to the rear plate 94 and extend forwardly to be received in closely toleranced holes in the front plate 98.

The upper ends of each of the front plate 98 and rear plate 94 may be formed to define inwardly extending ledges 112 (FIG. 7) which are spaced from each other to define a transverse elongated slot 114 through which the knife (to be described) may pass. The upper surfaces of each of the ledges 112 carries an elongate strip 114 of insulative, resilient material, such as silicon rubber and a pair of a pair of rear and front electrical resistance heating wires 116, 118 extend transversely along the surfaces of the insulative strips 114. The ends of the wires pass over the lateral ends of the insulative strips 114 and are attached to pivotally mounted terminals 120 (FIG. 6) which are biased by a spring (not shown) to apply a slight longitudinal tension to the wires. The terminals 120 are connected by wires 122 to the power supply for the heating wires as will be described.

The upper sealing assembly includes a transversely extending ear plate 124 having bushings 126 formed at its lateral ends and which receive and are slidable along the vertical rods 88 to guide the rear plate and all the elements carried by it vertically toward and away from the lower sealing assembly 84. The rear plate 124, in turn, is suspended from the lower ends of a pair of actuating rods 128 by lugs 130 formed at each end of the rear plate 124, the lugs 130 each having a hole which receives the lower end of the rod 128. A nut 132 is fastened to the lower, protruding end of the actuating rod 128. When the rods 128 are raised (as will be described) the upper cutting and sealing assembly will be separated from the lower sealing assembly 84 as shown in FIGS. 4 and 6 to permit the web to be advanced through the space defined therebetween.

The rear plate 124 of the upper sealing assembly 86 carries a front plate 134. Spacers 136 are mounted to the front plate 134 and rear plate 124 respectively. The spacers carry inwardly facing pads 138 which are made from a low friction material such as polytetrafluoroethylene (Teflon) to slidably guide and receive a cutting knife 140. The upper sealing assembly also includes an upper gripping bar 142 which has a friction pad 144 extending along its lower edge. The gripping bar 142, front plate 134 and spacers 136 are secured to the rear plate 124 in a manner similar to that which the elements in the lower sealing assembly were secured, by screws having knobs 146 which pass through holes in the plate 142, 134 and spacers 136 and which are screwed into the rear plate 124. Registration pins 137 also are secured to the rear plate 124 and extend through holes in the lateral ends of the spacers 136 to insure proper alignment of these elements.

The lower edges of the plates 124, 134 are of similar configuration to the facing upper edges of the plates 94, 98 in the lower sealing assembly. Thus, a pair of elongated insulative rubber strips 148 are attached to the lower ends of the plates 124, 134. A pair of resistance heating wires 116, 118 extend along the surfaces of the strips 148. The wires 116, 188 in the upper sealing assembly 86 are held in place and are under a slight tension in the same manner as described above with regard to the lower sealing assembly 84. The rearward pair of upper and lower wires 116 are in alignment with each other as are the forward pair of wires 118.

The knife 140 is in the form of a flat, transverse sheet of of metal extending between the registration pins 137, and has sharp teeth 150 formed along its lower edge. The knife 140 is suspended from a transversely extending bar 152. The ends of the bar 152, in turn, are secured to the actuating rods 128 for movement in unison with the rods 128. After a length of the sheet has been advanced by the feed rolls 50, 52 through the slot between the separated upper and lower sealing assemblies 84, 86, the rods 128 are permitted to move downwardly to advance the upper sealing assembly 86 toward the lower sealing assembly 84 to grip the web therebetween to hold it firmly in readiness to be heat sealed and cut. When the upper sealing assembly 86 has come to rest on the lower sealing assembly, continued movement of the rods 128 continues to drive the knife 140 downwardly to advance its cutting edge 150 through the portion of the web which is disposed in the space 114. The region of the web which is cut is held firm and taut between the feed rolls 50, 52 on one side of the knife and the gripper bars 106, 142 on the other side of the knife. This insures that the web will be severed cleanly and will not tend to be urged or drawn downwardly into the space 114 in a U-shaped configuration. This lost motion is permitted because of the slidable connection between the rods 118 and the lugs 130. If desired, a compression spring 154 may be interposed between the lug 30 and the bar 152 and about the rod 128 to serve as a shock absorber. The sealing wires 116 and/or 118 can be operated anytime after the upper sealing assembly has moved downwardly into engagement with the lower sealing assembly. In this regard, it should be noted that the power supply for the heating wires 116, 118 delivers the precise amount of energy required to seal the bag. The plastic web is not overheated which might cause the overheated seal line of the web to separate when engaged by the knife (particularly with a dull knife) which would enable the knife to draw the web into the space 14 without actually making a complete and clear cut. With the present invention, the timing sequence of the operation of the heating wires is not as critical as with the typical prior art devices. As a result the sealing function can begin as soon as the upper sealing assembly has engaged the web.

The rods 128 are operated by a pneumatic cylinder 156 (FIGS. 1 and 3) which is pivoted at one end to the frame and has a piston rod which is connected to a crank arm 158. The crank arm 158, in turn, is rigidly secured to an end of a shaft 160 mounted on top of the upper head frame member 42 by bearings 162. A pair of actuating levers 164 are secured to the shaft 160 and are connected by a pivot link 166 to the upper end of the actuating rods 128. The cylinder 156 is operated normally to maintain the upper sealing assembly 86 in its upper, idle position. WHen it is desired to cut and seal a bag, the cylinder 156 is depressurized which enables the upper sealing assembly 86 to advance downwardly under its own weight. After the cutting and sealing operation has been completed, the cylinder 156 is reactivated to raise the upper sealing assembly 86 to its idle position in readiness for another cycle.

The machine includes an improved drive for the feed rollers 50, 52 which is mounted on the frame as suggested at 168. The drive arrangement 168 is constructed and arranged to rotate the feed rolls through an angle which will advance the web in an increment equal to the desired bag length or width, depending on the type of bag being made. The drive arrangement can be controlled to vary the predetermined angle of feed roll rotation to thereby enable the machine to make bags of any length (or width). FIG. 8 shows, diagrammatically, the preferred type of drive mechanism which includes a rotary fluid motor 170 having an output shaft 172 which is connected to the main shaft 56 of the lower feed roll assembly 52. The fluid motor 70 is powered by a pump 174 which is controlled by a valve 176. The valve 176 is arranged so that the extent to which it is opened controls the speed and power of the fluid motor 170. The valve and motor arrangement 170, 176 includes a feedback shaft 178 which is directly connected to and rotates at the same speed as the motor 170. The feedback shaft 178 is connected through a threaded coupling 180 to the output shaft 182 of a gear train 184 which, in turn, is driven by a stepping motor 186. The output shaft 182 of the gear train 184 is mounted both for rotation and for axial movement and the threaded coupling 180 is constructed to permit axial displacement of the shaft 182 with respect to the feedback shaft 178 when there is any relative rotation between the feedback shaft 178 and the output shaft 182. The extent to which the valve 176 is open (thereby controlling operation of the fluid motor 170) is controlled as a function of the axial position of the shaft 182. Opening and closing of the valve 176 is controlled by a lever 188 which, in turn, is pivoted to a link 190. The link 190 is in turn pivoted to a link 192 having a fixed pivot 194. The other end of the link 192 is pivoted through a yoke to the shaft 182. The step motor 186 controls operation of the fluid motor 170 and, thus, the feed roll drive. For example, with the valve 176 closed and in readiness to begin operation, the step motor 186 is operated to rotate the shaft 182. Because the valve 176 is closed and motor 170 thereby stationary, the feedback shaft 178 also will remain stationary which, because of the threaded coupling 180 will cause the shaft 182 to shift axially. This, in turn, through the links 192, 190 begins to rotate the lever arm 188 to open the valve 176 and permit fluids from the pump 174 to begin operation of the fluid motor 170. As the fluid motor 170 accelerates, its feedback shaft 178 also accelerates and begins to approach the speed of the shaft 182. The linkage 190, 192, 188 continues to open the valve 176 progessively until the speed of the feedback shaft 178 equals the speed of shaft 182. Thereafter, the arm 188 and its drive linkage remains stationary and the motor will continue to operate until the step motor 186 is stopped (as controlled by the associated electronic control circuitry). When the step motor 186 stops, the rotation of shaft 182 also stops. Because the valve is still in an open position, the motor 170 will continue to rotate which, in turn, causes relative rotation of the feedback shaft 178 with respect to the then stationary shaft 182, although in a reversed direction fro when the valve was opening. This causes the shaft 182 to shift axially, in a reversed direction which through the links 190, 192 operates the lever 188 to shut the valve and stop the fluid motor 170.

From the foregoing, it will be seen that the extent to which the output shaft 172 of the fluid motor 170 is rotated is dependent on the angle through which the step motor 186 is rotated. this can be controlled with a high degree of precision by electronic control circuitry capable of stepping the motor 186 through a precise predetermined number of equiangular incremental steps. Such control circuits are known to those of ordinary skill in the art and are available commercially. While with the drive arrangement described, there is some lag between the time that the step motor starts and the fluid motor 170 starts (and between stopping of the step motor and fluid motor) these lag times are equal and the extent of angular rotations of the step motor and fluid motor correspond to each other with a high degree of precision.

The above described drive arrangement provides numerous advantages over and avoids many of the difficulties which have been inherent in the prior types of drives, such as reciprocating crank-type drives. The control over the incremental length of bag advanced is more precisely and easily controlled by simply controlling the number of steps through which the step motor is advanced. There is no need to shut the machine down and make mechanical adjustments with the frequency required with the crank drives. Typically, the prior crank type of drive employs a clutch and brake arrangement in which the length of web fed is controlled by braking the feedrolls and disengaging the crank drive from the feedrolls (by the clutch) to enable the crank drive to be returned to its starting position in readiness for the next feeding cycle. Some time lag results between engagement of the brake with the feedroll shaft and actual stopping of the feedroll shaft which will cause the feedrolls to continue to drive the web a short distance after the brake is applied. This usually is compensated for by timing operation of the brake so that it engages the feedroll shaft slightly in advance, with the expectation that when the feedroll does stop, the web will have been advanced to the intended position. However, because these machines are operated at high speeds requiring rapid and repetitive operation of the brake and clutch, it is common for the brake mechanism to become heated which, in turn, causes variations in the extent of web feeding which occurs after the initial application of the brake. For these reasons, considerable difficulty is encountered in controlling the bag length with precision.

These difficulties become particularly acute when the bags include printed material located at regularly spaced intervals along the web. When manufacturing such printed bags, a photoelectric sensing device typically is employed with the control mechanism to sense the advancement of a registration mark imprinted on the web in association with each of the printed patterns. The crank drive mechanism typically is adjusted to advance the web a distance slightly greater than that at which the printed pattern is repeated on the web and the photoelectric sensing system controls the drive mechanism to engage the brake and disconnect the drive mechanism from the feedrolls with the expectation that when the feedrolls stop completely, the web will be positioned precisely at the proper location with respect to the cutting and sealing unit. While with such a system the timing of the operation of the brake and clutch can be adjusted by shifting the position of the photoelectric sensor longitudinally along the path of advancement of the web, such a system necessarily will suffer from the same problems described above in which it is difficult to control the extent of web feeding after initial application of the brake. When making bags bearing printed material improper positioning of the web with respect to the cutting and sealing unit can result in bags with improperly positioned printed material which may be unusable for their intended purposes.

The machines must be checked frequently to insure that this does not occur.

The present invention provides the ability to control accurately the extent of web which is fed after the "stop" signal is generated. For example, when making printed bags, the output from the photoelectric sensor is employed to initiate the stopping the step motor after a precisely predetermined number of successive steps. For example, the step motor may be controlled to make fifty additional steps after the photoelectric sensor has sensed the passing of the registration mark on the web. The stepping motor will stop precisely after fifty steps and the fluid motor will continue to drive the feedrolls which will decelerate but will continue to advance the web until the valve has been closed. As mentioned above, the lag between stopping of the step motor and stopping of the fluid motor is regular and precise and is not subject to the variations inherent in the prior brake and clutch type of system. As a result, the length of web which is fed can be controlled with far greater precision and with minimal adjustment to the machine.

Also among the advantages of the present invention is that the drive mechanism can be restarted to advance the next bag increment immediately after a sealing and cutting function has taken place, unlike the prior crank devices in which there is a waiting or idle period during which the crank must return to its starting position. In this regard, it should be noted that the sealing function is relatively short, of the order of 150 milliseconds. With the above drive arrangement, the web can be advanced immediately after the last sealing function has been completed and there is no need to wait for the crank to return to its beginning position. In addition, it should be noted that because the power supply for the heating wires 116, 118 delivers only the amount of energy required for the sealing function and does not overheat the wires, the wires are cool almost immediately after they have effected a seal and there is no significant delay required for the wires to cool down before raising the upper sealing assembly to permit advancement of the web.

Step motor-controlled fluid motors of the type described above are available commercially. One such known manufacturer is Saams (France) which can be obtained from Bird and Johnson, 110 Norfolk St., Walpole, Mass. 02081, in the United States.

The electronic control for the step motor may be of widely varied design which will be apparent to one of ordinary skill in the art. The number of steps of the motor, in order to advance the web a predetermined incremental length will, of course, depend on the diameter of the feedrolls. It may be noted that in the preferred embodiment of the invention, the feed rolls have a circumference equal to ten inches and the step motor and gear train 184 is selected so that one complete revolution of the step motor 184 requires 100 steps thus enabling the length of the bag to be varied in one-tenth inch increments.

FIG. 9 shows, diagrammatically, the control circuit for applying electrical power to the heating wires 116, 118. A separate and identified control circuit is associated with each of the wire pairs 116, 118. Only one is illustrated here. Depending on the type of bag being made, either or both of the wires pairs 116, 118 may be operated and their power circuits can be controlled by a single manual switch.

The system includes a power supply 200 which generates a rectified 60 Hz output. Power supply 200 drives a system clock 202 which generates a square wave output having an 8.3 millisecond period. The output from system clock 202 drives a monostable multivibrator 204 which develops a short output pulse for each input from the clock 202. The output from multivibrator 204 is applied, through line 206, to an input of an AND gate 208. The other input to AND gate 208 is from line 210 which is coupled, through a noise filter, indicated generally at 212, to the signal input line 214. Signal input line 214 receives a "start" pulse in phase with the operation of the other parts of the machine to begin operation of the sealing circuit at the appropriate time. For example, line 214 may be connected to the control circuitry for the step motor to apply a pulse to line 214 when the step motor 186 has made its last step. Should it be desirable to delay operation of the sealing circuitry until the web has stopped moving, a delay circuit (not shown) may be interposed in the line 214. When line 214 is pulsed, a pulse 210 is applied to the other input of AND gate 208 and line 210 remains pulsed for a time interval which is greater than the period between the output pulses from multivibrator 204. In the illustrative embodiment, for example, the pulse in line 210 may be of the order of 10 milliseconds duration. When both inputs to AND gate 208 are high, the high output from AND gate 208 is applied, through line 216 to the "set" input of a flip flop 218. The output from flip flop 218 is connected, through a buffer 220 to a triac 222 or other suitable electronic switch, to enable power to be applied directly to the load circuit pairs 116 and/or 118. The duration during which power is applied to the load (and consequently the amount of energy applied to the wires 116,118) is controlled by a counter 224 and binary decoder 226. The counter is enabled through line 228 which is connected to the output from flip flop 218. The counter 224 receives an input, through line 228 from the system clock 202 and, when enabled in response to a high output from flip flop 218 will begin to count the output pulses from system clock 202, through line 228. The counter 224 is connected to the binary decoder 226 which, in turn, is connected through switch 230 and line 232 to the "reset" terminal of flip flop 218. Switch 230 can be connected to any of the various output terminals of decoder 226 with each output respresenting a different number of time intervals. When flip-flop 218 has been reset, triac 222 will shut off, thus terminating the power to the load wires 116, 118. With this arrangement, the energy applied to the wires 116, 118 may be controlled with a high degree of precision in that the switch 230 can be set to precisely control the total amount of electrical energy applied to the wires 116, 118. In practice, the total amount of energy is selected, with respect to the bag thickness and material so that the precise amount of energy to heat the wires sufficiently to seal is employed. There is no overheating or underheating of the wires and substantially all of the heat developed by the wires is applied to the sheet material being sealed. The wires are cool to the touch immediately after a sealing function has taken place and the upper sealing assembly can be raised immediately. If desired, an adhesion-resistant, film have good heat transfer properties may cover the wires as suggested at 211 in FIG. 8. For example, such a film may be a thin woven material coated with polytetrafluoroethylene (Teflon).

Noise filter 212 may be of a number of constructions. One such noise filter is shown which includes a monostable multivibrator 234 which is connected to line 214 to receive the "start" pulse. The time constant of multivibrator 234 is, as mentioned, greater than the period between output pulses of multivibrator 204, for example, of the order of 100 milliseconds. In order to filter out extraneous noise input signals from line 214, the output from multivibrator 234 also is applied, through line 236 to monostable multivibrator 238 which has a substantially larger time constant, of the order of 100 milliseconds. The output from multivibrator 238 is applied, through line 240 to the disabling input of multivibrator 234 to disable multivibrator 234 from generating any output pulses for 100 milliseconds after line 214 has received its first pulse.

It should be noted that while the foregoing sealing arrangement is believed to provide significant advantages over the prior art sealing systems and, when used in combination with the web feeding system also described above results in a high speed and accurately controllable machine, there may be instances in which it is desirable to employ other types of sealing and/or cutting devices while obtaining the advantages of the improved web advancing devices. For example, there may be some instances in which it is preferred to make side weld bags using an overheated wire in which the sealing and cutting function is performed by the overheated wire. As described above, the cutting and sealing assembly is easily detachable from the frame of the machine and other types of cutting and/or sealing mechanisms may be employed. It also should be noted that the invention enables the web to be sealed either at its leading end, or at its trailing end, or both. In some instances, it is desirable that the leading end be sealed to insure that after the bag has been cut and sealed, its leading end is not opened by the air as it is ejected from the machine. Also, in other instances, it may be desirable to eject the bag in a manner which will tend to open the mouth of the bag in which case the machine may be operated to effect the seal at the trailing end of the bag. With the invention, the machine may be operated in either mode.

It should be understood that the foregoing description of the invention is intended merely to be illustrative thereof and that other modifications and embodiments of the invention may be apparent to those skilled in the art without departing from its spirit.

Having thus described the invention, what I desire to claim and secure by Letters Patent is:

1. A feeding mechanism for advancing a web of thin, flexible sheet material, the feeding mechanism including a frame and a pair of feed rolls mounted to the frame for rotation about parallel axes, said mechanism comprising:

a plurality of thin walled, enlarged large diameter cylinders;

said cylinders being mounted coaxially and in spaced relation to each other;

a plurality of connective shaft segments extending between the adjacent ends of adjacent cylinders and to the outer ends of the outermost cylinders and being secured rigidly to said ends of said cylinders, said connective shaft segments being of relatively small diameter and being substantially shorter than their associated cylinders;

bearing means mounted to the frame to rotatably support each of the conductive shaft segments;

said feed rolls being mounted with respect to each other so that the outermost surfaces of the cylinders of one feed roll cooperate with the corresponding outermost surfaces of the cylinders on the other feed roll to define a nip line to grip and advance the web in response to rotation of one of said feed rolls;

a rotary fluid motor connected to the connective shaft of one of the rolls;

a pump;

a valve for controlling the rate of liquid flow from the pump to the motor;

a stepping motor for operating the valve; and feedback means from the fluid motor to the valve and being response to termination of operation of the stepping motor to shut the valve and thereby stop the fluid motor.

* * * * *